US008859875B2

(12) United States Patent
Daniels

(10) Patent No.: US 8,859,875 B2
(45) Date of Patent: Oct. 14, 2014

(54) MUSICAL SCORE DISPLAY CONVERSION SYSTEM

(71) Applicant: William Nathan Daniels, Lakeland, FL (US)

(72) Inventor: William Nathan Daniels, Lakeland, FL (US)

(73) Assignee: SingSlide Presentations, LLC, Auburndale, FL (US)

( * ) Notice: Subject to any disclaimer, the term of this patent is extended or adjusted under 35 U.S.C. 154(b) by 0 days.

(21) Appl. No.: 13/842,874

(22) Filed: Mar. 15, 2013

(65) Prior Publication Data

US 2014/0260904 A1 Sep. 18, 2014

(51) Int. Cl.

| | |
|---|---|
| ***G10H 1/36*** | (2006.01) |
| ***G10H 7/00*** | (2006.01) |
| ***G09B 15/02*** | (2006.01) |

(52) U.S. Cl.

CPC .................................... *G09B 15/023* (2013.01)
USPC ............................................................ 84/634

(58) Field of Classification Search

USPC ............................. 84/609, 634; 715/200–277
See application file for complete search history.

(56) References Cited

U.S. PATENT DOCUMENTS

| | | | | |
|---|---|---|---|---|
| 5,760,323 | A * | 6/1998 | Romero et al. | 84/470 R |
| 6,084,168 | A * | 7/2000 | Sitrick | 84/477 R |
| 6,348,648 | B1 * | 2/2002 | Connick, Jr. | 84/477 R |
| 6,635,815 | B2 * | 10/2003 | Kosakaya et al. | 84/471 R |
| 7,649,134 | B2 * | 1/2010 | Kashioka | 84/600 |
| 7,703,014 | B2 * | 4/2010 | Funaki | 715/269 |
| 7,754,955 | B2 * | 7/2010 | Egan | 84/600 |
| 7,919,705 | B2 * | 4/2011 | Miller | 84/616 |
| 2001/0022127 | A1 * | 9/2001 | Chiurazzi et al. | 84/47 |
| 2008/0017722 | A1 * | 1/2008 | Snyder et al. | 235/494 |
| 2008/0060500 | A1 * | 3/2008 | La et al. | 84/486 |
| 2008/0060507 | A1 * | 3/2008 | Welchering | 84/645 |
| 2008/0065983 | A1 * | 3/2008 | Sitrick | 715/273 |
| 2011/0203442 | A1 * | 8/2011 | Raveendran | 84/483.1 |

* cited by examiner

*Primary Examiner* — Jeffrey Donels
(74) *Attorney, Agent, or Firm* — Cygnet IP Law, P.A.; Stephen W. Aycock, II

(57) ABSTRACT

Methods, systems and computer readable media for musical score presentation conversion are described. For example, in some implementations the method can include receiving a musical notation file, and formatting the musical notation file according to predetermined parameters. The method can also include exporting formatted notation images, and importing the formatted notation images into a converter. The method can further include converting the formatted notation images into a presentation, and providing the presentation for display.

3 Claims, 4 Drawing Sheets

MUSICAL SCORE DISPLAY CONVERSION SYSTEM

TECHNICAL FIELD

Embodiments relate generally to musical performance and practice systems, and more particularly, to methods, systems and computer readable media for converting musical notation files into musical performance/practice presentations.

BACKGROUND

Traditional printed scores for choirs, chorus groups and other musicians may be limited in that one or both of a musician's hands may be occupied with holding the printed score and turning pages. Also, a musician may lose his or her place in the score relative to the group.

Embodiments were conceived in light of the above-mentioned problems and limitations, among other things.

SUMMARY

Some implementations can include a computerized method for musical score presentation conversion. The method can include receiving, at one or more processors, a musical notation file, and formatting, with the one or more processors, the musical notation file according to predetermined parameters. The method can also include exporting, with the one or more processors, formatted notation images, and importing, with the one or more processors, the formatted notation images into a converter. The method can further include converting, with the one or more processors, the formatted notation images into a presentation, and providing the presentation for display.

DETAILED DESCRIPTION

Figure 1:
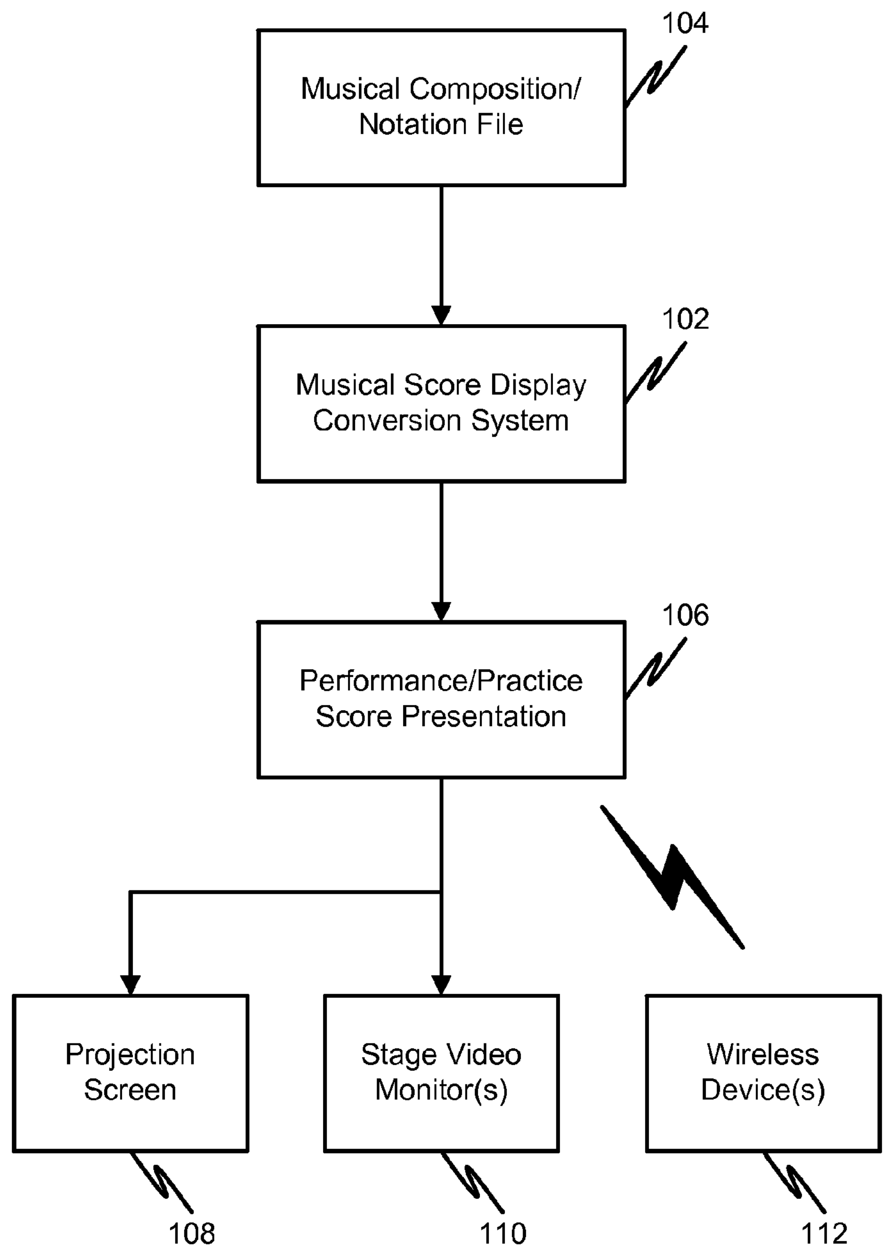
FIG. 1 is a diagram of an example musical score display conversion system in accordance with at least one embodiment.

FIG. 1 is a diagram of an example musical score display conversion system environment 100. The environment 100 includes a musical score display conversion system 102, a musical composition/notation input file 104, a performance/practice score presentation 106 and one or more of a projection screen 108, stage video monitors 110 and wireless devices 112.

In operation, the musical score display conversion system 102 receives the musical composition/notation input file 104 as input and performs a conversion from the notation file to the performance/practice score presentation 106. The a performance/practice score presentation 106 can then be displayed using one or more of a projection screen 108, stage (or rehearsal room) video monitors 110 and wireless devices 112 (e.g., tablet computers, smartphones, media players, electronic book readers, laptop computers, desktop computers or the like). The conversion can be performed according to a method such as that described below in connection with FIG. 4.

Figure 2:
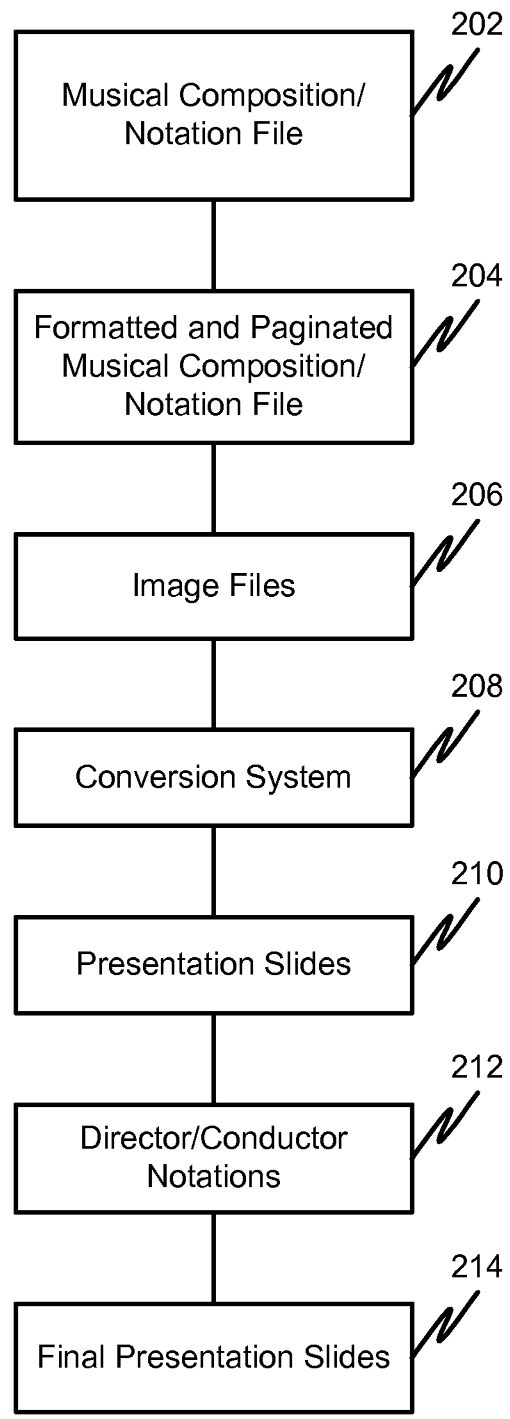
FIG. 2 is a flowchart of an example data flow for a musical score display conversion system in accordance with at least one embodiment.

Referring to FIG. 2, the data flow for an example process includes a musical composition/notation file 202 (e.g., similar to that generated by notation software such as Finale, Sebelius or the like). The musical composition/notation file 202 is formatted and paginated according to predetermined parameters to yield a score page that contains a portion of the score and which may be more readable at a distance.

The formatted and paginated musical composition/notation file 204 is then output as one or more images files 206. The image files 206 are used as input to a conversion system 208 that converts the image files into a presentation 210 (e.g., a PowerPoint presentation or the like).

The presentation 210 can be annotated using the presentation software to include director or conductor performance/practice notations 212. The result is a final presentation 214 for display during practice or performance.

Figure 3:
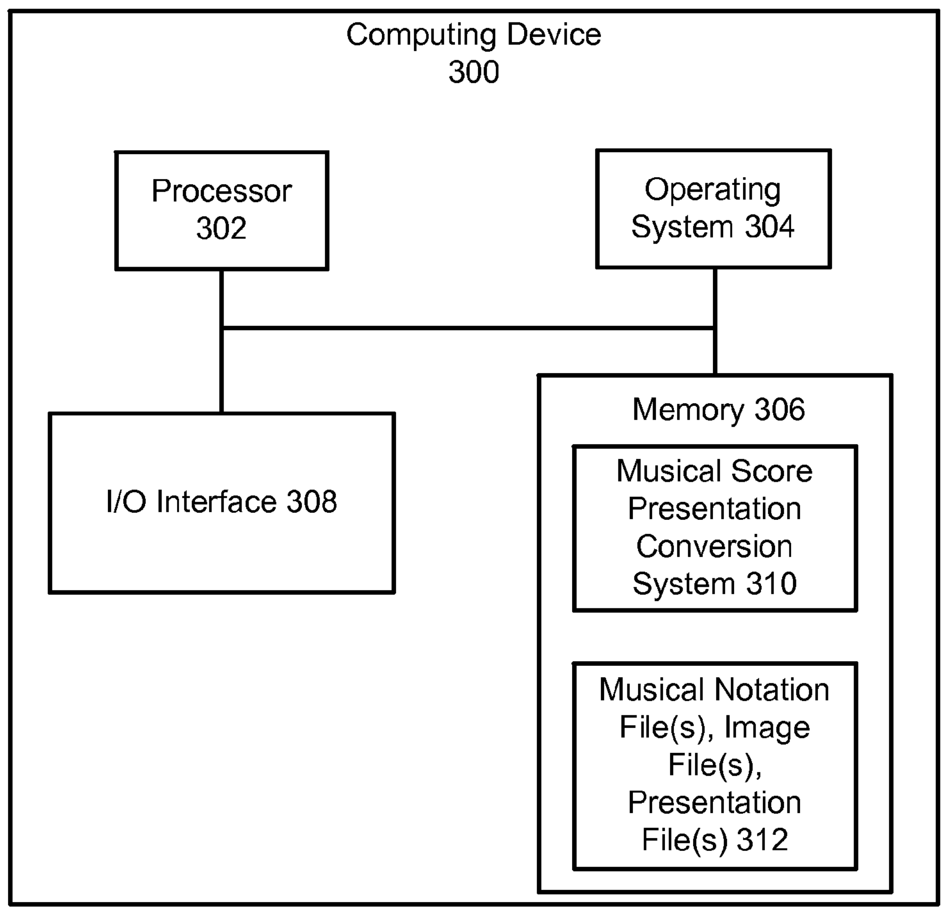
FIG. 3 is a diagram of an example computer system in accordance with at least one embodiment.

FIG. 3 is an example computer system 300 for musical score display conversion in accordance with at least one embodiment. The system 300 includes a processor 302, operating system 304, memory 306 and I/O interface 308. The memory 306 can include a musical score presentation conversion system 310 and a database of one or more notation files, image files and presentation files 312.

In operation, the processor 302 may execute the application 312 stored in the memory 306. The application 312 can include software instructions that, when executed by the processor, cause the processor to perform operations for musical score presentation conversion in accordance with the present disclosure (e.g., performing one or more of steps 402-414 described below).

The application program 310 can operate in conjunction with the stored data 312 and the operating system 304.

Figure 4:
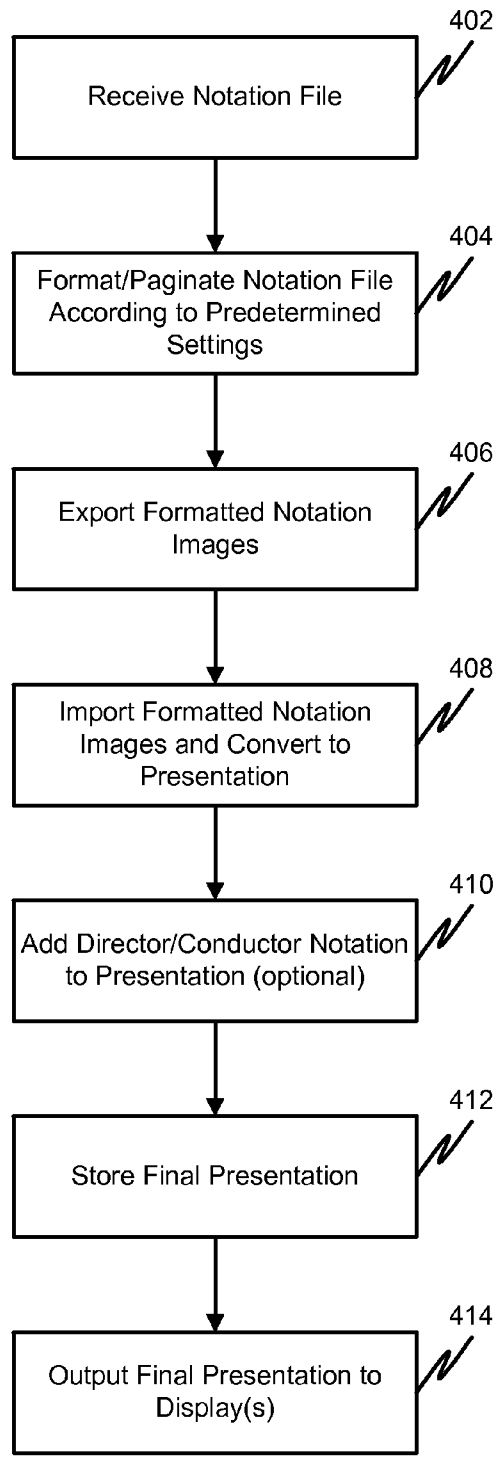
FIG. 4 is a flowchart of an example method for musical score display conversion in accordance with at least one embodiment.

FIG. 4 is a flow chart of an example method for musical score presentation conversion. Processing begins at 402, where a notation file is received. The notation file can be in the form generated by a musical notation software package such as Finale or Sebelius. Processing continues to 404.

At 404, the notation file is formatted and paginated according to predetermined settings (e.g., font size, note size and the like). Optionally, the formatted and paginated notation file can be adjusted. Processing continues to 406.

At 406, images of the formatted and paginated notation file are exported from the notation software. Processing continues to 408.

At 408, the exported notation images are imported to a converter and converted into a presentation (e.g., PowerPoint presentation). The conversion can include placing each image on a separate slide of the presentation. Processing continues to 410.

At 410, notations can optionally be added to the presentation slides. The notations can include director and/or conductor notations for rehearsal or performance. Processing continues to 412.

At 412, the final presentation is stored. Processing continues to 414.

At 414, the final presentation is output for display. When being presented, pages of the slide presentation can be turned manually or, the presentation can be time coded so as to be synchronized with a music track (e.g., a stem track) and the pages can be turned automatically in coordination with the playback of the music track.

The presentation can be sent to one or more projection screens, video monitors or handheld devices. The presentation can be delivered wirelessly to tablet computers, smart phones or the like so that a musician can have a local copy of the presentation on their device. The page turning can be done manually by the musician or synchronized to the page turning of a master presentation (either manually or automatically).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and publishing arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for musical score presentation conversion.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computerized method for musical score presentation conversion comprising:

receiving, at one or more processors configured to convert a musical score in electronic form to an electronic presentation, an electronic musical notation file;

formatting, with the one or more processors, the electronic musical notation file according to one or more predetermined parameters to produce one or more formatted musical notation images;

exporting, with the one or more processors, the formatted musical notation images;

importing, with the one or more processors, the formatted musical notation images into a converter adapted to transform the formatted musical notation images into an electronic presentation;

converting, with the one or more processors, the formatted musical notation images into an electronic presentation; and providing, from the one or more processors, the electronic presentation for display.

2. A system comprising:

one or more processors configured to perform operations including:

receiving an electronic musical notation file;

formatting the electronic musical notation file according to one or more predetermined parameters to produce one or more formatted musical notation images;

exporting the formatted musical notation images;

importing the formatted musical notation images into a converter adapted to transform the formatted musical notation images into an electronic presentation;

converting the formatted musical notation images into an electronic presentation; and providing the electronic presentation for display.

3. A nontransitory computer readable medium having stored thereon software instructions that, when executed by a processor, cause the processor to perform operations including:

receiving an electronic musical notation file;

formatting the electronic musical notation file according to one or more predetermined parameters to produce one or more formatted musical notation images;

exporting the formatted musical notation images;

importing the formatted musical notation images into a converter adapted to transform the formatted musical notation images into an electronic presentation;

converting the formatted musical notation images into an electronic presentation; and providing the electronic presentation for display.

* * * * *